US 12,021,917 B2

United States Patent
Ensign et al.

(10) Patent No.: US 12,021,917 B2
(45) Date of Patent: Jun. 25, 2024

(54) METHOD FOR ENABLING COMMUNICATION BETWEEN A USER DEVICE BROWSER AND A LOCAL DEVICE

(71) Applicant: Zebra Technologies Corporation, Lincolnshire, IL (US)

(72) Inventors: Christopher Ensign, Volo, IL (US); Richard E. Bergstrom, Lake Villa, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 14/577,201

(22) Filed: Dec. 19, 2014

(65) Prior Publication Data

US 2016/0182604 A1   Jun. 23, 2016

(51) Int. Cl.
*H04L 67/025* (2022.01)
*G06F 3/12* (2006.01)
(Continued)

(52) U.S. Cl.
CPC .......... *H04L 67/025* (2013.01); *G06F 3/1206* (2013.01); *G06F 3/1228* (2013.01);
(Continued)

(58) Field of Classification Search
CPC ..... H04L 67/025; H04L 67/02; G06F 3/1206; G06F 3/1228; G06F 3/1289; G06F 3/1209; G06F 3/1246; G06F 17/30905
(Continued)

(56) References Cited

U.S. PATENT DOCUMENTS

2003/0041102 A1\* 2/2003 Simpson ............... H04L 29/06
                                                                 709/203
2003/0137691 A1\* 7/2003 Tanaka ................. G06F 3/1289
                                                                 358/1.18
(Continued)

FOREIGN PATENT DOCUMENTS

JP   2003-0216367 A   7/2003
JP   2005-205834 A   8/2005
(Continued)

OTHER PUBLICATIONS

International Search Report and Written Opinion dated Feb. 26, 2016 in counterpart PCT application PCT/US2015/061299.
(Continued)

*Primary Examiner* — Tan Doan

(57) ABSTRACT

A method, computer program product and system are provided to enable communication between a browser on a user device, such as a mobile device or personal computer, and a local device, such as a printer. A host system may provide a host web application for generating data for display by a browser, and may also integrate with an application programming interface (API) to embed code into the host web application such that when executed by the browser, enables the communication between the browser and a local device communication application. The local device communication application may then control communication to the local device, such as causing the data to be printed on a printer. The provided methods may be implemented independently of the browser type and/or operating system type.

14 Claims, 6 Drawing Sheets

(51) Int. Cl.
H04L 67/02 (2022.01)
*G06F 16/957* (2019.01)

(52) U.S. Cl.
CPC ............ G06F 3/1289 (2013.01); H04L 67/02 (2013.01); *G06F 3/1209* (2013.01); *G06F 3/1246* (2013.01); *G06F 16/9577* (2019.01)

(58) Field of Classification Search
USPC ........................................................ 709/217
See application file for complete search history.

(56) References Cited

U.S. PATENT DOCUMENTS

| | | | | |
|---|---|---|---|---|
| 2004/0120002 | A1* | 6/2004 | Brooks | G07F 17/42 719/321 |
| 2004/0130746 | A1* | 7/2004 | Wu | H04N 1/00278 358/1.15 |
| 2004/0145769 | A1* | 7/2004 | Collier | G06F 3/1205 358/1.15 |
| 2005/0262437 | A1* | 11/2005 | Patterson | G06F 17/243 715/243 |
| 2007/0091361 | A1* | 4/2007 | Matsugashita | G06F 3/1208 358/1.15 |
| 2009/0089811 | A1* | 4/2009 | Ferlitsch | G06F 3/1287 719/321 |
| 2009/0310172 | A1* | 12/2009 | Miyamoto | G06F 3/1288 358/1.15 |
| 2010/0026741 | A1* | 2/2010 | Gold | B41J 2/0057 347/7 |
| 2011/0153410 | A1* | 6/2011 | Muthugopalakrishnan | G06Q 30/00 705/14.39 |
| 2011/0202631 | A1* | 8/2011 | Berna Fornies | H04L 67/04 709/219 |
| 2011/0209137 | A1* | 8/2011 | Berg | G06F 3/1204 717/171 |
| 2013/0194634 | A1* | 8/2013 | Sankaranarasimhan | G06F 3/1228 358/1.15 |
| 2013/0286425 | A1* | 10/2013 | Nakamura | G06F 3/1204 358/1.13 |
| 2014/0049790 | A1 | 2/2014 | Nakamura | |
| 2014/0313542 | A1* | 10/2014 | Benchorin | G06F 3/1292 358/1.15 |

FOREIGN PATENT DOCUMENTS

| | | |
|---|---|---|
| JP | 2007241489 A | 9/2007 |
| JP | 2012168684 A | 9/2012 |
| JP | 2014-21948 A | 2/2014 |
| KR | 1020110088521 A | 3/2013 |

OTHER PUBLICATIONS

Office Action for Japanese Patent Application No. 2017-533188 dated May 1, 2018.
Final Rejection for Japanese Patent Application No. 2017-5533188 mailed on Oct. 21, 2019.
Notice of Preliminary Rejection for Korean Patent Application No. 10-2017-7016362 mailed on May 10, 2018.

* cited by examiner

```
PRINTER CONFIGURATION
Zebra Technologies
ZTC 170XiIII-300dpi

+10.................. DARKNESS
+000.................. TEAR OFF
TEAR OFF............. PRINT MODE
CONTINUOUS........... MEDIA TYPE
WEB.................. SENSOR TYPE
THERMAL-TRANS........ PRINT METHOD
168 00/12 MM......... PRINT WIDTH
1520................. LABEL LENGTH
39.0IN   988MM....... MAXIMUM LENGTH
PARALLEL............. PARALLEL COMM.
RS232................ SERIAL COMM.
9600................. BAUD
7 BITS............... DATA BITS
EVEN................. PARITY
1 STOP BIT........... STOP BITS
XON/XOFF............. HOST HANDSHAKE
NONE................. PROTOCOL
000.................. NETWORK ID
NORMAL MODE.......... COMMUNICATIONS
<~> 7EH.............. CONTROL PREFIX
<^> 5EH.............. FORMAT PREFIX
<,> 2CH.............. DELIMITER CHAR
ZPL II............... ZPL MODE
FEED................. MEDIA POWER UP
FEED................. HEAD CLOSE
DEFAULT.............. BACKFEED
+000................. LABEL TOP
+0000................ LEFT POSITION
0080................. HEAD TEST COUNT
0500................. HEAD RESISTOR
OFF.................. VERIFIER PORT
OFF.................. APPLICATOR PORT
025.................. WEB S.
075.................. MEDIA S.
072.................. RIBBON S.
000.................. MARK S.
000.................. MARK MED S.
000.................. MEDIA LED
001.................. RIBBON LED
100.................. MARK LED
+10.................. LCD ADJUST
DPSWFXM.............. MODES ENABLED
..................... MODES DISABLED
1984 12/MM FULL...... RESOLUTION
..................... SOCKET 1 ID
V33.10.0PPS <-....... FIRMWARE
..................... HARDWARE ID
CUSTOMIZED........... CONFIGURATION
4096.............R:   RAM
NONE.............B:   MEMORY CARD
2048.............E:   ONBOARD FLASH
NONE................. FORMAT CONVERT
007 POWER SUPPLY..... J12 INTERFACE
005 DISPLAY.......... J11 INTERFACE
*** NONE............. J10 INTERFACE
*** NONE............. J9 INTERFACE
*** NONE............. J8 INTERFACE
*** NONE............. J7 INTERFACE
..................... TWINAX/COAX ID
DYNAMIC.............. IP RESOLUTION
ALL.................. IP PROTOCOL
010.003.004.148...... IP ADDRESS
255.255.255.000...... SUBNET MASK
010.003.004.001...... DEFAULT GATEWAY
2000-03-23 15:21:53   TIME STAMP
```

METHOD FOR ENABLING COMMUNICATION BETWEEN A USER DEVICE BROWSER AND A LOCAL DEVICE

BACKGROUND

Various embodiments of the invention are related to enabling communication between a user device browser and a local device. Applicant has identified a number of deficiencies and problems associated with printing content from a browser on a user device with a local printer. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided to enable communication between a browser configured to operate on a user device, such as a mobile device or personal computer, and a local device, such as a printer. Many websites displayed by browsers running on user devices cannot directly interact with local network devices such as printers. Web developers of various systems may want to enable users of their webpages to print from a user device in a streamlined and secure manner. Current implementations for printing directly from a browser include operating system and/or browser specific methods. For example, ActiveX® and Java™ Applet implementations allow for printing directly from a browser, however, these applications are not available on all user devices and may introduce security vulnerabilities.

The methods, computer program products, and apparatus provided herein provide for a streamlined approach to enable communication between a browser operative on a user device and a local device such as a printer. Example embodiments provided herein are not browser type dependent, nor operating system dependent. According to example embodiments provided herein, a developer of a host system may integrate with an application programming interface (API) such that the host web application delivered by the host system to a browser running on a user device communicates with an installed local device communication application of the user device. The local device communication application may in turn control communications and/or printing to other local devices as directed by the host system.

A computer program product is provided, the computer program product configured to operate on a user device to enable communication between a local device and a browser, wherein the browser is configured to operate on the user device, and the computer program product is configured to receive a request generated by the browser, determine that the request includes a request to communicate data transmitted from the browser via the computer program product, and cause transmission of a device command to the local device, wherein the device command is generated based on the data transmitted from the browser and information relating to the local device.

In some examples, the computer program product determines the local device is a defaulted local device. The computer program product is further configured to provide a list of available local devices for display on a user interface of the user device via the browser, and receive a local device selection indication based on a selection by a user from the list via the user interface, wherein the local device is identified based on the local device selection indication. In some examples, the computer program product is further configured to verify a permission status of the local device relative to a requesting host web application.

The computer program product is further configured to cause the user device to output a user permission prompt relating to a host web application and the local device via the browser, receive an authorization indication in response to the outputting of the user permission prompt via the browser, and update a permission status relating to the host web application and the local device based on the authorization indication.

The computer program product further comprises a local device communication application programming interface configured for enabling embedding of a script in a host web application, wherein the determining that the request includes the request to communicate data transmitted from the browser comprises executing the script, and receipt of the request from the browser and the transmission of the device command to the local device occurs in response to execution of the script.

In some examples, generating the device command comprises converting Hypertext Markup Language (HTML) to a print command incorporating content, style, and positioning information derived from the HTML. In some examples, the data is received via an asynchronous JavaScript call executed by the browser. In some examples, the local device is a printer, and the device command transmitted to the printer is a print command. In some examples, the printer is controlled by Zebra Proprietary Language.

In some examples, the device command causes at least one of: the local device to return local device configuration information to the user device, the local device to return local device status information to the user device, or the local device to print local device configuration information. In some examples the computer program product is configured to receive a local device response from the selected local device.

A system is also provided, for facilitating communication of data from a browser to a local device, wherein the browser is configured to operate on a user device, and the system comprises a local device communication application that is configured to operate on the user device, a host web application configured to operate on a host system; and a local device communication application programming interface configured to operate on the host system, wherein the local device communication application programming interface is configured for communication with the host web application, wherein the host web application generates data for display by the browser and further enables the browser to communicate with the local device communication application, and wherein the local device communication application is configured to receive the data from the browser, convert the data to a device specific format, and transmit the converted data to the local device.

The local device communication application is further configured to provide available local devices to the browser for display and to receive a local device selection indication, and wherein the local device is identified based on the local device selection indication. In some examples, converting the data comprises converting Hypertext Markup Language (HTML) to a print command incorporating content, style, and positioning information derived from the HTML.

In some examples, the local device is a printer, and the device command transmitted to the printer is a print command. The local device communication application is further configured to receive a local device response from the local device in a device specific format, and cause provision of a message for display by the browser based on the local device response. The local device communication application is further configured to verify a permission status of the local device relative to a requesting host web application.

In some examples, the local device communication application is further configured to cause the user device to output a user permission prompt relating to a host web application and the local device via the browser, receive an authorization indication in response to the outputting of the user permission prompt via the browser, and update a permission status relating to the host web application and the local device based on the authorization indication.

In some examples, the data is received from the browser via an asynchronous JavaScript call executed by the browser.

A computer-implemented method is also provided for facilitating communication of data from a browser to a local device, wherein the browser is configured to operate on a user device, the computer-implemented method comprising receiving a request generated by the browser, determining that the request includes a request to communicate data transmitted from the browser via the computer program product, and cause transmission of a device command to the local device, wherein the device command is generated based on the transmitted data from the browser and information relating to the local device.

In some examples, the computer-implemented method of claim 21, further comprises converting the data received from the browser to a device specific format based on a type of local device.

BRIEF DESCRIPTION OF THE SEVERAL VIEWS OF THE DRAWINGS

FIG. 8 is an example label printed by a local device according to example embodiment.

DETAILED DESCRIPTION

Figure 1:
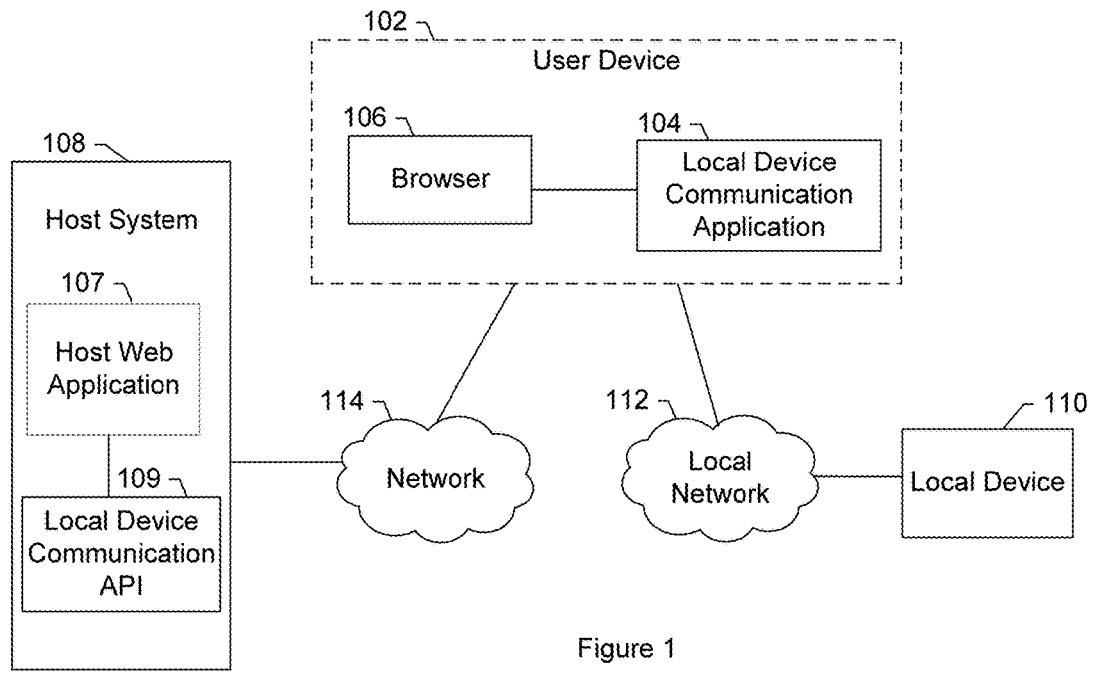
FIG. 1 is a schematic representation of a system according to example embodiments.

According to example embodiments provided herein, a method, computer program product and system are provided to enable communication between a browser configured to operate on a user device, such as a mobile device or personal computer, and a local device, such as a printer. A host system may provide a host web application for generating data for display by a browser, and may also integrate with a local device communication application programming interface (API) to embed code into the host web application such that when executed by the browser, enables the communication between the browser and a local device communication application. The local device communication application may then control communication to the local device, such as causing the data presented by the browser to be printed on a printer.

As used herein, a "local device communication API" may include computer program code, such as a library or collection thereof, stored on a host system or otherwise accessible by a host system that is configured to enable communication between the browser and a local device communication application.

As user herein, a "local device communication application" is an application or app configured for operation on the user device to enable communication between the browser and a local device, as directed by a host web application interfacing with the local device communication API.

As used herein, a "script" may include any computer program code, such as JavaScript, configured to be executed by the client, or browser as directed by a host web application interfacing with the local device communication API.

As used herein, a "device request" may include any communication to the local device communication application from the browser requesting information regarding available local devices or data to be transmitted to a local device.

As used herein, a "device command" may include any communication such as computer program code configured to be transmitted from the local device communication application to the local device. In some examples, the device command may be a "device specific command," or a device command formatted specifically for a specific type of local device and may only be interpretable by a local device of that type. A device specific command may include a print command.

As used herein, "data" may include any data provided by the browser to be transmitted to the local device for processing. For example, the data may include computer program code defining content to be printed by a local printer.

As used herein, a "local device selection indication" may include any information identifying a particular local device to which data is to be transmitted from the user device. The local device selection indication may be defaulted in instances only one local device is available, for example. Or, the local device selection indication may indicate a preconfigured default local device. In some examples a user may select a particular local device from a list of available local devices.

As used herein, a "local device response" may include a communication from the local device to the user device transmitted in response to a device command. The local device response may therefore confirm receipt of device commands and/or completion of the processing.

As used herein, a "permission status" may include any information indicating whether or not the host web application and/or host system has permission to access a particular local device. The permission status may be maintained and/or accessed by the local device communication application.

As used herein, a "user permission prompt" may include any message outputted to the user of the user device requesting permission for the host web application and/or host system to access the local device. The user permission prompt may be, for example provided to the user via the browser.

As used herein, an "authorization indication" may therefore be considered any user input indicating permission is granted for the host web application and/or host system to access the local device. A permission status may be updated accordingly based on an authorization indication, which may be provided via the browser, for example.

FIG. 1 is a schematic diagram of an example system 100 for enabling communication between a browser on a user device and a local device. User device 102 may include any mobile device such as a smart phone, tablet, and/or the like and may be characterized by a relative light weight and small size compared to other computing devices such as personal computers and laptops. User device 102 may therefore have limited memory and computational processing speed compared to larger or heavier computing devices. While example embodiments provided herein are particularly advantageous in instances user device 102 is implemented as a mobile device, user device 102 may additionally or alternatively be implemented on other user devices such as personal computers, laptops, and/or any device capable of running a browser. Furthermore, example embodiments may implement any operating system.

User device 102 may execute a locally installed application, or "app," such as to interact with other applications operative on the user device 102 and/or other devices over a network. Such apps are typically designed to execute on user devices, such as tablets or smartphones. For example, an app may be provided that executes on user device operating systems such as Apple Inc.'s iOS®, Google Inc.'s Android®, or Microsoft Inc.'s Windows 8®. These platforms typically provide frameworks that allow apps to communicate with one another and with particular hardware and software components of user devices, third party services, and/or networks. For example, the operating systems named above each provide frameworks for interacting with location services circuitry, wired and wireless network interfaces, user contacts, and other applications in a manner that allows for improved interactions between apps while also preserving the privacy and security of consumers. In some embodiments, an operating system may also provide for improved communication interfaces for interacting with external devices (e.g., home automation systems, indoor navigation systems, and the like). Communication with hardware and software modules executing outside of the app is typically provided via application programming interfaces provided by the device operating system.

Local device communication application 104 is an app operative on the user device 102, and may be configured to communicate with a browser 106 running on the user device 102 and/or an external device over a local network, such as local network 112. The local device communication application 104 is described in further detail with respect to FIG. 2.

The browser 106 may include any application configured to render content for display on the user device 102. Browser 106 may include, but is not limited to, Firefox®, Internet Explorer®, Chrome™, Opera™, and Safari®. The browser 106 may be a mobile version of a browser and may have limited capabilities compared to browsers configured for use with personal computers or laptops. In some examples, multiple browsers 106 may be present on user device 102. The browser 106 may be configured to display content provided by host web application 107 and/or host system 108.

System 100 may include any number of host system(s) 108. Host system 108 may include any computing device, network, server, and/or the like configured for providing web applications, such as host web application 107, to the user device 102 over local network 112. Host system 108 may communicate with user device 102 over network 114, such as over the Internet. In particular, host system 108 may provide host web application 107 via network 114 for display by browser 106.

Host web application 107 may be integrated with local device communication API 109. The local device communication API 109 may include computer program code, such as a library or collection thereof, stored on host system 108 or otherwise accessible by host system 108, which is configured to enable communication between browser 106 and the local device communication application 104. For example, the local device communication API 109 may be stored on a memory device, similar to that of memory 204 described herein. According to example embodiments, the local device communication API 109, when implemented by host web application 107, enables communication between browser 106 and the local device communication application 104. The local device communication API 109 therefore enables developers of the host system 108 to easily incorporate components into host web application 107, such that once executed by the browser 106, interface with the local device communication application 104 such that content generated by the host web application 107 may be transmitted to local devices via the local device communication application 104, as described in further detail hereinafter. In some examples the local device communication API 109 may be implemented on the host system 108, or may be accessed on a remote device, such as a third party server or additional host system 108. In this regard, the host system 108 may be implemented as a distributed system or network and may comprise processing circuitry, similar to the processing circuitry 201 described herein. The host system 108 may provide web applications, content, and functionality enabled by the local device communication API 109 to any number of user devices 102.

System 100 may additionally include any number of local devices 110. Local device 110 may include any external device in communication with the user device 102 over local network 112. An example local device 110 may include but is not limited to a printer, scanner, computing device, user device, and/or the like. The local device communication application 104 enables communication between the user device 102 and local devices 110.

Local network 112 may therefore include any number of local devices 110 configured to communicate with the user device 102, such as by direct connection or wireless communication. For example, local network 112 may be implemented as a local area network (LAN), and may facilitate communication between devices by direct connection such as Universal Serial Bus (USB), serial port, and/or parallel port. The local network 112 may additionally or alternatively be configured to enable communication by ZigBee®, active near field communication (NFC), and/or other wireless protocols.

In some examples, networks 112 and 114 may be the same network, or local network 112 and/or 114 may include portions of each other. However, in some embodiments, host system 108 may communicate with the user device 102 over network 114, but not with local device 110. Therefore, local device 110 may not necessarily be available over the Internet or network 114, but rather communicate with the user device 102 over local network 112 (which may be implemented as a LAN, direct connection, and/or the like as described above). In some embodiments, network 114 may include the Internet.

Figure 2:
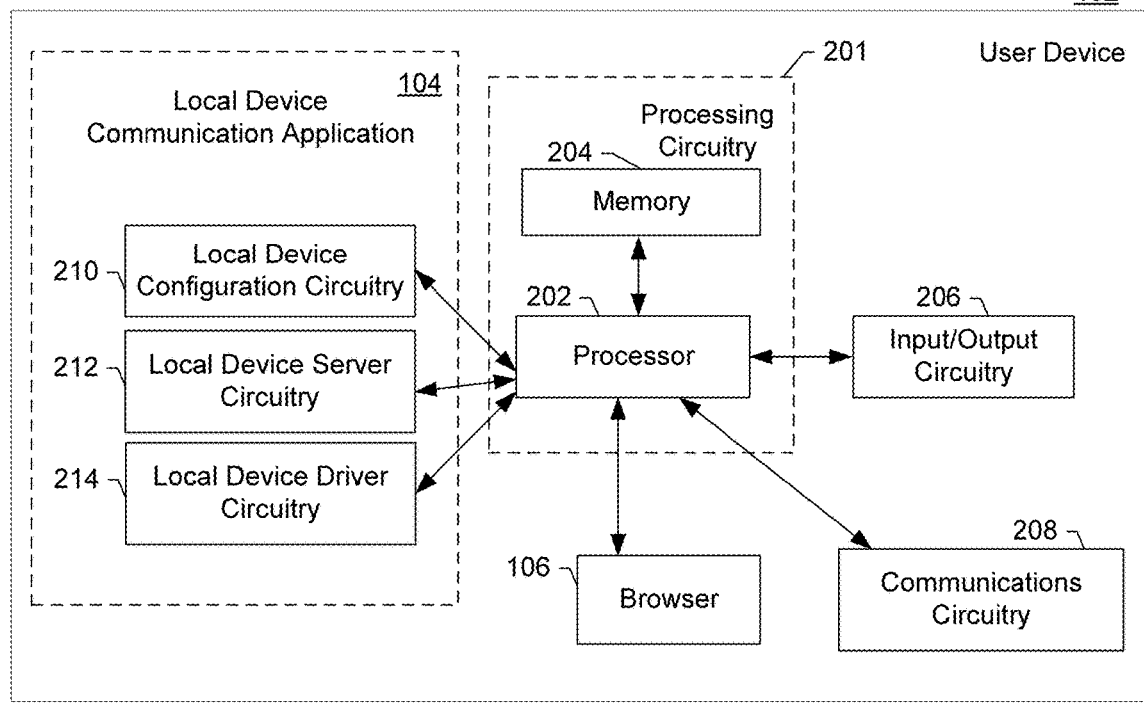
FIG. 2 is a schematic representation of a user device according to example embodiments.

FIG. 2 is a schematic diagram of an example user device 102 according to example embodiments. In some embodiments, processing circuitry 201 operative on the user device 102 may be embodied as or comprise a circuit chip including any of the processor 202, memory 204, input/output circuitry 206, communications circuitry 208, the local device communication application 104, and/or browser 106. The local device communication application 104 may further comprise any of local device configuration circuitry 210, local device server circuitry 212, and/or local device driver circuitry 214, and in some embodiments may be implemented on memory 204 and processor 202 of the user device 102. The processing circuitry 201 may be embodied as a circuit chip (e.g., an integrated circuit chip) configured (e.g., with hardware, software, or a combination of hardware and software) to perform operations described herein. The circuit chip may constitute means for performing one or more operations for providing the functionalities described herein.

Processor 202 may perform some or all of the processing functionalities introduced above and described in further detail hereinafter. Memory 204 may be utilized for storage of data, such as configurations of local devices 110, and data to be transmitted to local devices 110. Processor 202 may store and access this data, as needed, while performing the various operations.

The processor 202 may be embodied in a number of different ways. For example, the processor 202 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 202 may comprise a plurality of processors. The plurality of processors may be in operative communication with each other and may be collectively configured to perform one or more functionalities of the local device communication application 104 and/or user device 102 as described herein. The plurality of processors may be embodied on a single computing device or distributed across a plurality of computing devices. In some example embodiments, the processor 202 may be configured to execute instructions stored in the memory 204 or otherwise accessible to the processor 202. As such, whether configured by hardware or by a combination of hardware and software, the processor 202 may represent an entity (e.g., physically embodied in circuitry—in the form of processing circuitry 201) capable of performing operations according to embodiments of the present invention while configured accordingly. Thus, for example, when the processor 202 is embodied as an ASIC, FPGA, or the like, the processor 202 may be specifically configured hardware for conducting the operations described herein. Alternatively, as another example, when the processor 202 is embodied as an executor of software instructions, the instructions may specifically configure the processor 202 to perform one or more operations described herein.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories configured to store information, data, applications, instructions and/or the like for enabling the user device 102 to carry out various functions in accordance with one or more example embodiments. For example, the memory 204 may be configured to store permission and serial information relating to any of the detected local devices. The memory 204 may be additionally configured to buffer input data for processing by the processor 202. Additionally or alternatively, the memory 204 may be configured to store instructions for execution by the processor 202. As yet another alternative, the memory 204 may include one or more databases that may store a variety of files, contents, or data. Among the contents of the memory 204, applications, such as the local device communication application 104 and/or browser 106 may be stored for execution by the processor 202 to carry out the functionality described herein.

The local device communication application 104 may comprise local device configuration circuitry 210, local device server circuitry 212, and/or local device driver circuitry 214. Circuitry 210, 212 and/or 214 may each include respective and/or shared hardware configured to perform functions as described hereinafter, and communicate with respective circuitry and components of user device 102 via a network interface. Circuitry 210, 212 and/or 214 may utilize processing circuitry, such as the processor 202, to perform such actions. However, it should also be appreciated that, in some embodiments, any of the circuitry 210, 212 and/or 214 may include a separate processor, specially configured field programmable gate array (FPGA), or application specific interface circuit (ASIC) to perform various respective functions, described in further detail hereinafter. Circuitry 210, 212 and/or 214 is therefore implemented using hardware components of the apparatus configured by either hardware or software for implementing these functions.

The local device configuration circuitry 212 may enable configuration of local devices 110 for communication with the user device 102, or more specifically, the local device communication application 104. The local device configuration circuitry 212 may be configured to scan network 212 for local devices 110 and maintain permission status information for which host web application 107 and/or host systems 108 may access particular local devices 110, such as by serial numbers of the local devices 110. In this regard, memory 204 may store serial numbers and corresponding indicators indicating a status such as "authorized" or "not authorized." In some examples, a list of authorized local devices may be stored, and absence of a local device serial number may indicate the local device permission status is "not authorized."

In this regard, the local device configuration circuitry 212 may comprise or generate a user interface for providing user permission prompts for prompting a user to grant or deny permission for access by a domain of the host web application 107 and/or host system 108 to a particular local device 110. Configuration may occur in response to installation of the local device communication application 104, or in response from a request from the browser 106 and/or local device server circuitry 212, described below. As another example, local device communication application 104 may prompt the user to allow local device communication application 104 to provide a list of local devices 110 to the host 108. Additionally or alternatively, a preference may be stored in memory 204 such that in the future, the list of local devices 110 may be provided without the user explicitly approving the transmittal of information. The host 108 may then provide the local devices 110 to the browser 106 for display, and/or the host 108 may direct printing to any one of the local devices 110 indicated. In some examples, if the user denies a prompt to allow the host 108 to access local devices 110, an error message may be provide, such as by display in browser 106, alerting the user that the access is denied.

The local device server circuitry 214 may, in general, listen over a local socket for requests generated by browser 106 and transmitted to port 9100, for example. When requests for the local devices are made, local device sever circuitry 214 communicates with local device configuration circuitry 212 to indicate a default device, or available local devices to the browser 106 and forward device commands to the desired local device 110 via the local device driver circuitry 214.

In general, the local device driver circuitry 214 is configured for processing instructions from the local device server circuitry 214, converting data to a device specific format compatible with a particular local device 110, and causing transmission of the data and/or device command to the local device 110. The local device driver circuitry 214 may also be configured to receive responses from the local device 110 and to communicate device responses to the local device server circuitry 214 and/or browser 106.

In some embodiments, the user device 102 may include input/output circuitry 206 that may, in turn, be in communication with processor 202 to provide output to the user and, in some embodiments, to receive an indication of a user input. For example, the input/output circuitry 206 may be used to display web application via browser 106, receive inputs regarding permitted local devices, and/or the like. The input/output circuitry 206 may comprise a user interface and may include a display, web user interface, a mobile application, and/or the like. In some embodiments, the input/output circuitry 206 may also include a keyboard, a mouse, a joystick, a touch screen, touch areas, soft keys, a microphone, a speaker, or other input/output mechanisms. The processor and/or input/output circuitry 206 comprising the processor may be configured to control one or more functions of one or more user interface elements through computer program instructions (e.g., software and/or firmware) stored on a memory accessible to the processor (e.g., memory 204, and/or the like).

The communications circuitry 208 may include one or more interface mechanisms for enabling communication over a network. In some cases, the communications circuitry 208 may be any means such as a device or circuitry embodied in either hardware, or a combination of hardware and software that is configured to receive and/or transmit data from/to a network and/or any other device or module in communication with the processing circuitry 201. By way of example, the communications circuitry 208 may be configured to enable the local device communication application 104 (e.g., with local device driver circuitry 214) to communicate with local device 110. In some embodiments, the communications circuitry 208 is further configured to enable communication between the user device 102 and host system 108, to provide the host web application 107 such as web application content and code for display and/or processing by the browser 106. Accordingly, the communications circuitry 208 may, for example, include supporting hardware and/or software for enabling communications via networks 112, 114, and/or the like.

Figure 3:
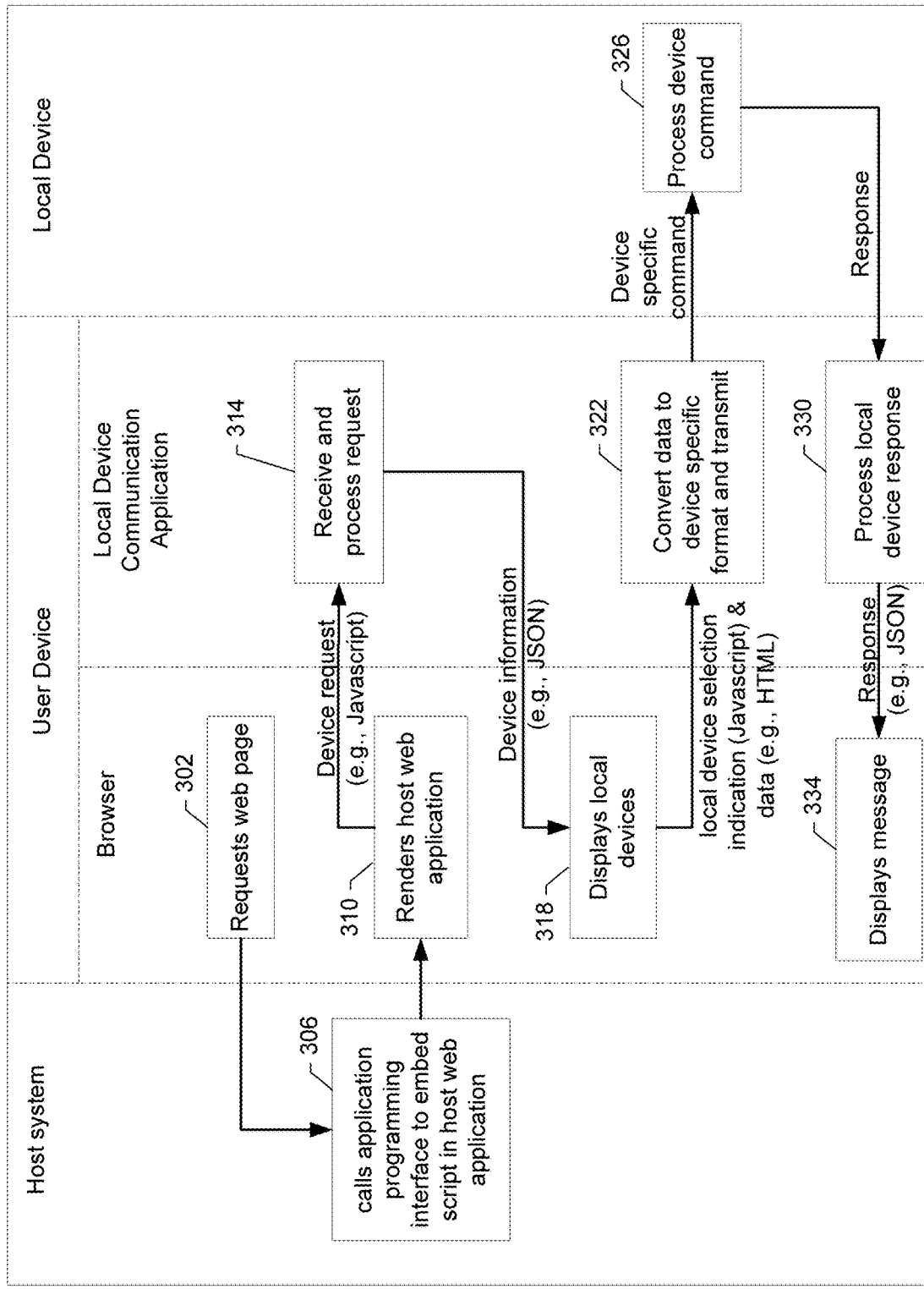
FIG. 3 is a flowchart of operations and data according to example embodiments.

FIG. 3 is an example flowchart of operations according to example embodiments. As shown by indicator 302, a user of user device 102 uses a browser 106 to access a web page provided by a host web application 107. At operation 306, the host system 108 and/or host web application 107 calls local device communication API 109 to embed a script into a response to transmit to the browser. The script may include any computer program code, such as JavaScript, configured to be executed by the client, or browser 106. The response may include additional content or computer program code, such as that generated by host system 108 and/or host web application 107 to be processed and/or displayed by the browser 106.

At operation 310, the browser processes the response from the host web application 107 and/or local device communication local device communication API 109, and renders content and/or images for display in the browser of the user device 102. In this regard, content displayed by the browser may include content generated by the host web application 107 independently of the local device communication API 109, in addition to the computer program code and/or script(s) provided by local device communication API 109. In some examples, execution of the script by the browser 106 enables a distinction to be made among requests, such that request intended for the local device communication application 104 are transmitted to the local device communication application 104 as described below.

Furthermore, content provided by the host web application 107 may be rendered independently of the response from the asynchronous call to local device communication application 104. The script processed by the browser 106 may include an asynchronous JavaScript call to the local device communication application 104 (e.g., to the local device server circuitry 212) requesting available local devices 110. Such a request may be considered a device request. The device request may include any communication to the local device communication application 104 requesting available local devices, and/or indicating data and/or requests to be transmitted to a local device 110. In some examples, the device request may be generated and transmitted automatically without further user interaction. In some examples, the user may indicate a desire to initiate communication to a local device 110 and the device request may be generated and transmitted in response to a user input. In some examples, no user input may be required.

As shown by operation 314, the local device communication application 104 may include means, such as local device configuration circuitry 210, for receiving and processing the request.

In some examples, the local device communication application 104 recognized that a default local device is configured, and forwards the request and/or data.

In some examples, in response to receiving the request generated by the browser, scanning a network (e.g., local network 112), such as a local area network and/or local machine for available and/or permitted devices. For example, the local device communication application 104 may identify local devices connected directly to the user device 102 or those available over the network. The local device communication application 104 may therefore provide serial numbers, device types, and/or other identifying information of available local devices 110, such as printers, fax machines, and/or the like. Additional functionality regarding the configuration of local devices for use by the local device communication application 104 is described in further detail hereinafter such as with respect to FIG. 4. In some examples, the local device may be defaulted and other available local devices may not necessarily be provided to the browser.

In some examples, as shown by operation 318, the browser 106 receives the local device information from the local device communication application 104, and displays information relating to the devices in the browser, as directed by the host web application 107 and/or local device communication API 109 via a web application. See for example, FIG. 6. The response provided to the browser may be in the format of JavaScript Object Notation (JSON) or Extensible Markup Language (XML). The local device information may therefore be displayed on the webpage without disruption of other content, or without refreshing other content, due to the asynchronous nature of the communication (e.g., Asynchronous JavaScript and XML (AJAX), and/or Asynchronous JavaScript and JSON (AJAJ)).

In some embodiments, a user may select a particular local device 110 of a plurality of local devices presented by the browser. In some examples, the user may select 'print,' or another interface component configured to trigger a request to the local device communication application 104. The request made to the local device communication application 104 may comprise a local device selection indication. The local device selection indication may include any information identifying a particular local device 110 to which data is to be transmitted. For example, the request may include an identifier of a local printer, as selected by the user, and the data (e.g., HTML, images, etc.) to be printed. In some examples, a local device selection indication may not be included, and a default local device may be identified instead, such as by the local device communication application 104.

As shown by operation 322, the local device communication application 104 may include means, such as the local device driver circuitry 210, processor 202, and/or the like, to convert the data to a device specific format specified for the local device 110 and transmit the data to the local device 110. In this regard, the local device driver circuitry 214 may identify a device command and/or type of data compatible with the particular local device 110, such as a select local device or default local device.

For example, the local device 110 may be identified as a device controlled by a proprietary language, such as the printer control language Zebra Programming language (ZPL).

For example, U.S. Pat. No. 8,717,285, titled, "Method and Apparatus for Printing HTML Content" describes a method, apparatus and computer program product for converting HTML to a printer control language and is hereby incorporated by reference in its entirety. The HTML may therefore be converted to a proprietary and/or procedural language that may be interpreted and processed by local device 110.

More specifically, the local device driver circuitry 214 may convert received HTML that specifies content to be printed to Extensible Hypertext Markup Language (XHTML) and generate style information based on an Extensible Stylesheet Language (XSL) template. The local device driver circuitry 214 may extract placement information, and generate a printer command incorporating the content from the XHTML and the style information such that execution of the printer command on the local device 110 results in rasterization of the content in the style specified by the HTML and in the position derived from the HTML. In this regard, the printer command may include "positioning information" including any information or device commands from which the local device 110 interprets the intended positioning or placement of the content relative to the media on which the content is to be printed. Example printer commands generated in ZPL by converting the data into the device specific language, ZPL are provided below. The ZPL commands incorporate placement information, style information, and content extracted from the data, which in some examples may be provided in HTML.
^XA^CI28^PW639^FT528,75^A@R,150,150,E:MYRDREG.ttf^FDZebra^FS^FT639,0^A@R,-37,37,E:MYRDREG.ttf^FD^FS^FT430,75^A@R,83,83,E:MYRDREG.ttf^FD Custom Applications
Group^FS^FT114,75^BY2,3.0^B3R,N,250,N,
N^FD*ZEBRACUSTOMAPPLICATION SGROUP*^-FS^XZ As another example, local device communication application 104 may convert a page description language such as Portable Document Format (PDF), PCL (Point Cloud Library), PostScript and/or the like, provided by browser 106, to ZPL. The content displayed in the PDF, PCL and/or PostScript may then be printed on a ZPL specific device.

The app 104 and/or local device driver circuitry 214 may therefore be preconfigured to convert data of one format, such as HTML, PDF, PCL, PostScript, and/or the like, and convert the data to a procedural command such as the above ZPL command. Once installed on the user device 102, the user device 102 may then be configured to convert data provided via browser 106, to the device specific format without further customization or development of the host web application 107.

In this regard, the local device communication application 104, or more specifically local device driver circuitry 214, may comprise a device driver, or may otherwise be configured to communicate with a device driver operative on the user device 102. Once the local device communication application 104 has converted the data received from the browser 106 to a format compatible with the local device 110, the local device communication application 104 may initiate transmittal of the device specific command and/or data to the local device 110.

In some embodiments, the local device communication application 104 may receive data from the browser that is formatted for the local device, and may not necessarily convert the data to another format. For example, the local device communication application 104 may receive commands in ZPL format. For example, ^HH is a ZPL command used to request printer configurations from a printer, such as local device 110, and ~HS is a ZPL command used to request printer status information. The local device 110 may therefore respond as described with respect to operation 330 below, and as illustrated in FIG. 8, also described hereinafter.

As shown by operation 326, the local device 110 may receive the device command from the user device 102. The device command may then be processed by the local device 110 and may include the data converted from the browser 106 to the device specific format. For example, in embodiments in which the local device 110 is a printer, the local device 110 may print the data transmitted by the user device as directed by the local device communication application 104. The printed content may therefore resemble the HTML or other content displayed by browser 106. In such an example, the device specific command for the printer may be considered a "print command." In some examples, a device command in a device specific format and/or print command may be in a proprietary language such as ZPL.

In some examples, as shown by operation 330, the user device 102 may include means, such as the local device communication application 104, local device driver circuitry 214, processor 202, communications circuitry 208 and/or the like, for receiving and processing a local device response from the local device 110. In this regard, the local device response may include a communication from the local device 110 transmitted to the user device 102. The local device response may therefore confirm receipt of device commands and/or completion of the processing. For example, the local device 110 may be configured to communicate to the local device driver circuitry 214 a local device response indicating that a print job is complete, and the local device driver circuitry 214 may be configured to process the local device response provided by the local device 110 which may include device specific codes including confirmations and/or error messages. The local device driver circuitry 214 may the local device response such that an additional communication may be transmitted to the browser 106, such as for the purposes of displaying a message to the user. The local device driver circuitry 214 and/or the local device communication application 104 may therefore cause provision of a message for display by the browser 106. In some examples, following an elapsed time period with no local device response from the local device 110, the local device driver circuitry 214 may generate a response so as to indicate the lack of response from the local device 110.

As another example, such as in response to the ^HH command mentioned above, the local device 110 may return local device status information, such as printer configuration information to the user device 102. The printer configuration information may include any settings or configuration information associated with a current state, components, hardware, and/or the like, of the local device 110. For example, printer configuration information may indicate darkness, print mode, media type, sensor type, firmware, memory card, and/or the like.

As yet another example, such as in response to the ^HS command mentioned above, the local device 110 may return local device status information, such as printer status information, to the user device 102. The local device response may therefore include printer status information including but not limited to pause flag, temperature indicators, number of formats in receive buffer, and/or label length. The printer status information may additionally or alternatively include error state information including but not limited to corrupt RAM flag, paper out flag, and/or buffer full flag.

As shown by operation 334, the browser 106 may be configured to receive a response from the local device communication application 104 (e.g., local device driver circuitry 214). The response may be in a format such as XML and/or JSON, such that the script run by the browser 106 may process the response and display a message without interfering with other content as provided by the AJAX and/or AJAJ framework. For example, the browser 106 may display to the user that a print job has completed, and/or provide an error message such as failure by the local device 110 to respond to the device command. In some examples, the browser 106 may display data received from the local device 110 such as the local device configuration information and/or local device status information.

In some examples, data received on the user device 102 from the local device 110, such as local device configuration information, and/or local device status information, may be further returned to the host system 108. The host web application 107 may therefore utilize the information in its processing. For example, adjustments may be made to generated labels based on the label length returned by the local device 110.

Figure 4:
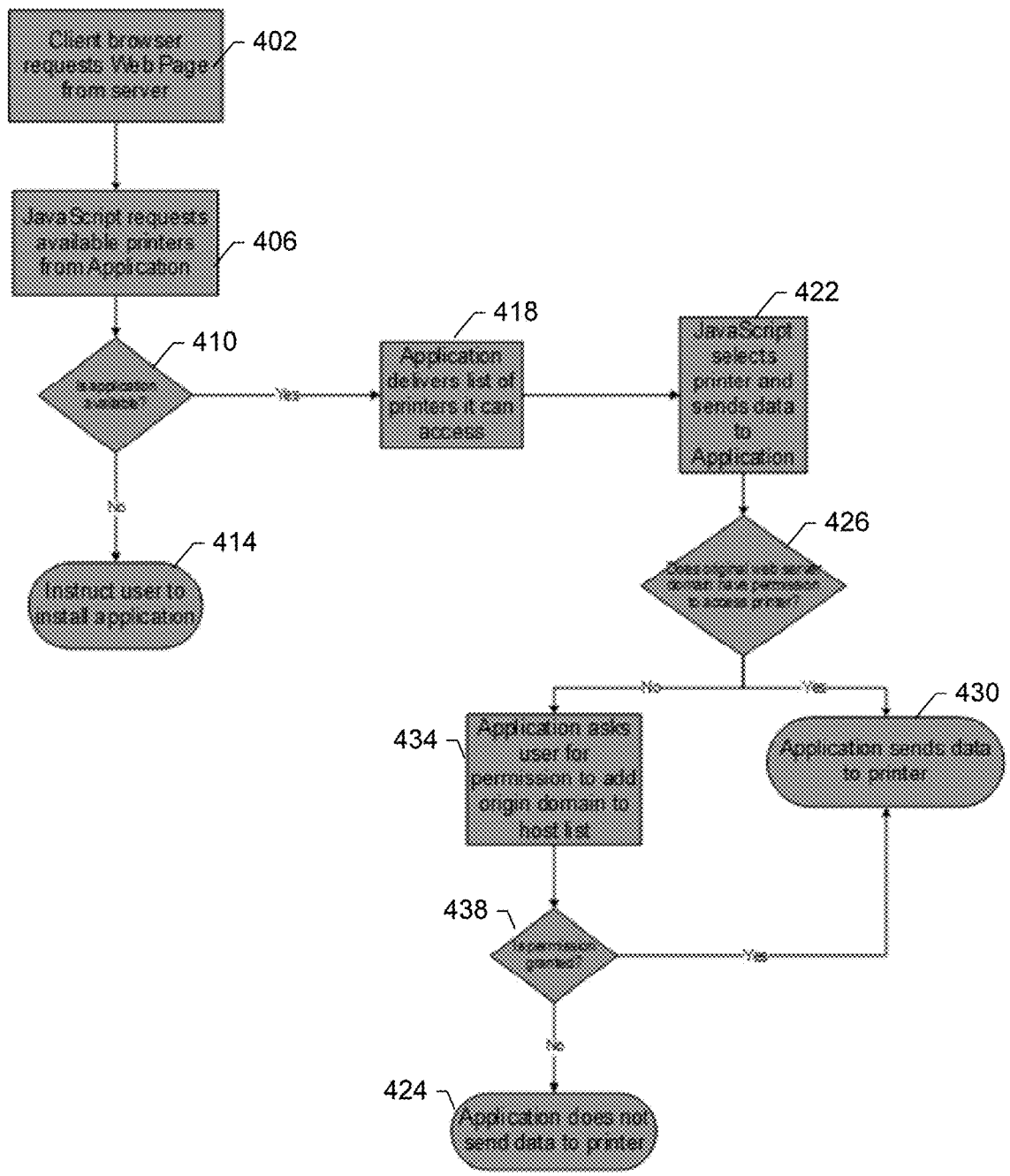
FIG. 4 is a flowchart of operations according to example embodiments.

The operations described above and illustrated in FIG. 3 are provided to illustrate example operations and communication between various components of the system 100 according to example embodiments. FIG. 4 is a flowchart diagram illustrating the configuration of the local device communication application 104 and local devices 110 to communicate with the local device communication application 104, such as with the local device configuration circuitry 210.

Figure 5:
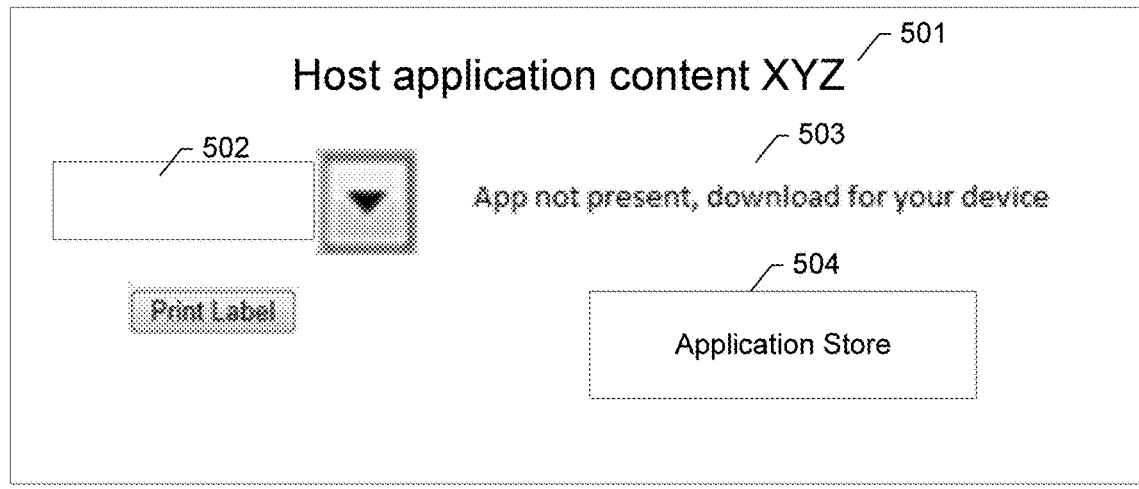
FIGS. 5 and 6 are user interfaces according to example embodiments.

As shown by operation 402, the browser 106 requests a web page from a server such as that of the host system 108 and/or from host web application 107. As shown by operation 406, JavaScript provided from the host system 108 and executed by the browser 106 requests available printers (or other local devices) from the local device communication application 104. As shown by operation 410 and 414, if the local device communication application 104 is not detected or is not available, the user may be prompted with instructions for installing the app, such as by way of an additional application on the user device 102. For example, the user may download the application from Google Play™ or other similar app store. FIG. 5 is an example interface generated by the browser 106 in an instance the local device communication application 104 is not installed. Content 501 may include any content provided by the host system 108 to be display by the browser 106, and may include for example, barcode labels (not shown) generated by the host web application 107 that a user may want to print on a local printer. Drop down 502 may appear empty because the local device communication application 104 is not available to provide the local devices 110. Message 503 indicates to the user that the local device communication application 104 is not present and should be downloaded. Link 504 provides a link to access the app store of the user device 102 so that the user may download the local device communication application 104. In some examples the local device communication application 104 may be defaulted and selected in the app store for easy installation.

Figure 6:
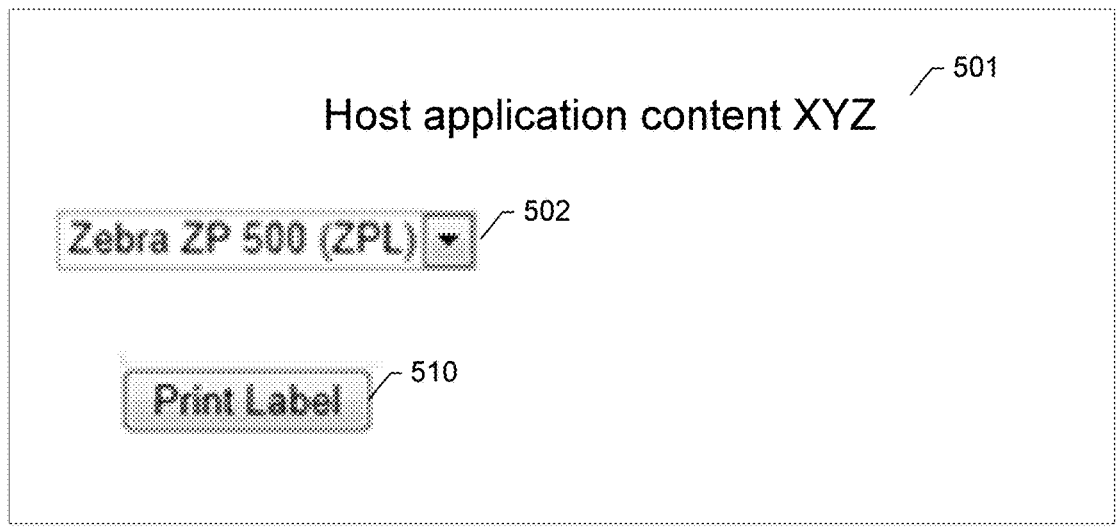
Figure 7:
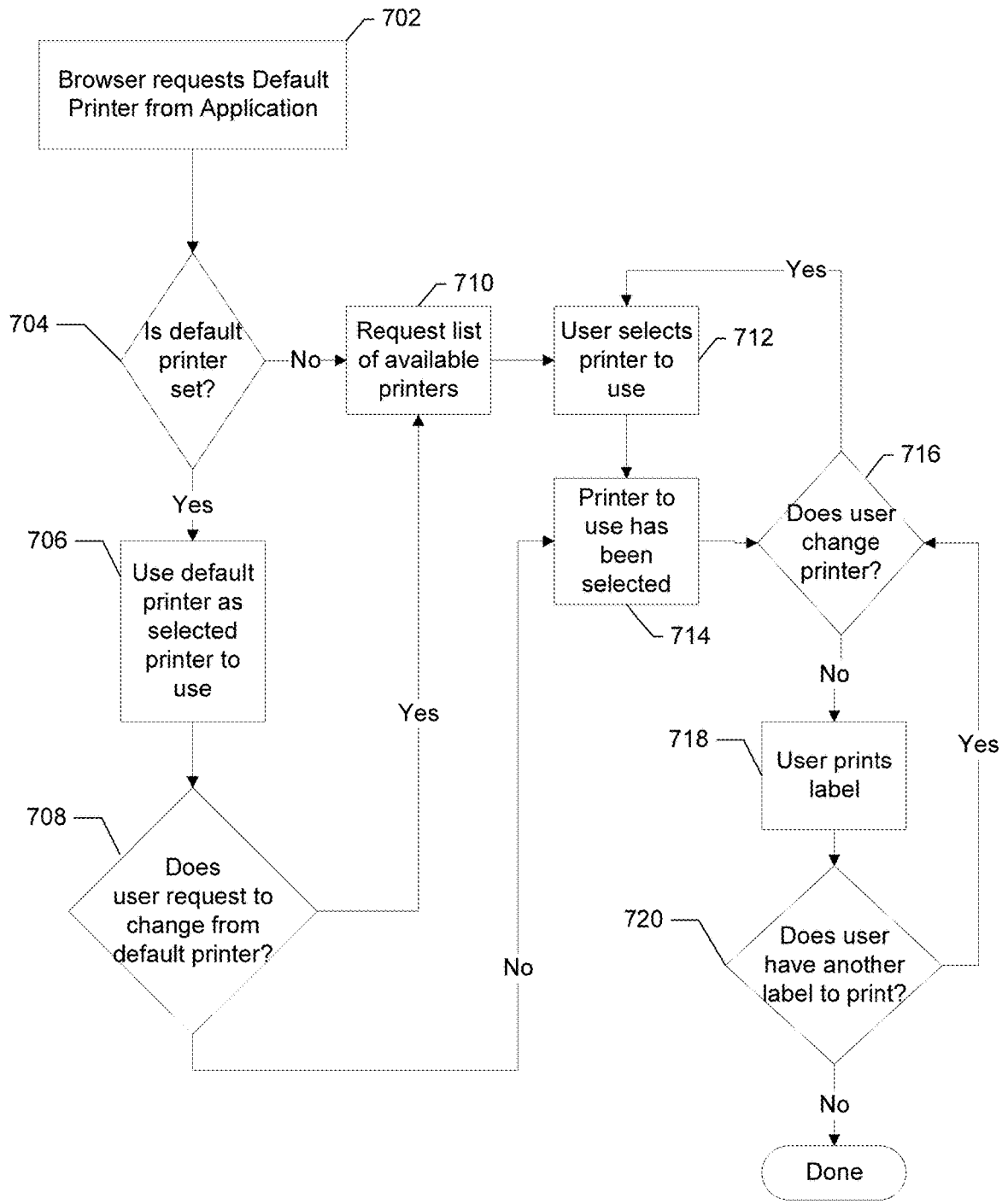
FIG. 7 is a flowchart of operation according to example embodiments.

Returning to FIG. 4, in instances the local device communication application 104 is installed and detected on the user device 102 (or following installation of the local device communication application 104), as shown by operation 418, the local device communication application 104 may provide a list of printers or other local devices 100, as described with respect to operation 314 above. At operation 422, the JavaScript selects the printer and sends data to the local device communication application 104. Said differently, a JavaScript call initiating from the browser 106 indicates to the local device communication application 104 a selected printer or local device 110. In some examples, the selected local device 110 may be selected by a user, or in some examples, such as in instances only one local device 110 is available, or a local device is set in the location device communication application 104 as the default local device, the selection may default to the default local device 110 without input from the user. FIG. 6 is an example interface generated by the browser 106 in an instance the local device communication application 104 is installed. In this regard the interface of FIG. 6 may be an updated version of the interface of FIG. 5 following installation of the local device communication application 104. In this example, the available local devices 110 are populated into dropdown 502 so that a user may select a printer, followed by the component 510 to initiate the transfer of data, such as content 501, to the selected printer (e.g., local device 110). FIG. 7 provides even further detail regarding local device selection indications and is described in further detail hereinafter.

Returning to FIG. 4, as shown by operation 426, the local device communication application 104 may determine whether the original web server domain (e.g., the host web application 107 and/or host system 108) has a permission status relative to each of the available local devices 110 and/or to scan the local network 112 and/or user device 102 for local devices 110. In this regard, a permission status may include any information indicating whether or not the host web application 107 and/or host system 108 has permission to access a particular local device 100. The local device communication application 104, such as with the local device configuration circuitry 210, may maintain a list of permitted domains, host web applications 107, and/or host systems 108 from which such communication is permitted. In some examples, once permitted, a host system 108 may access any local devices 110 through the browser 106 without additional queries to the user. Additionally or alternatively, local device 110 serial numbers and/or the like may be stored in association with a host web application 107 and/or host system 108 indicating whether a particular domain, host web application 107, and/or host system 108 may initiate requests (via the browser 106 rendering a page provided by the host web application 107 and/or host system 108) to a specified local device 110.

For example, if permission has been provided by the user of user device 102 in previous sessions, or by initial configuration of the local device communication application 104 for the particular host web application 107 and/or host system 108 to access the local device 110, then at operation 430, a device command and/or data may be sent to the selected local device 110 (e.g., printer), as described above with respect to operations 322 and 326. In some examples, if permission has not yet been granted, as shown by operation 434, the user of the user device 102 may be prompted to confirm that the requesting host web application 107 and/or host system 108 may communicate with the local device 110. In this regard, any message outputted to the user of the user device requesting permission for the host web application 107 and/or host system 108 to access the local device 110 may be considered a user permission prompt. Once an authorization indication is made by the user and provided to the local device communication application 104, the communication with the local device 110 may proceed as shown by operations 438 and 430. An authorization indication may therefore be considered any user input indicating permission is granted for the host web application 107 and/or host system 108 to access the local device 110.

In some examples, the user may not approve the host system 108's request (via browser 106) to communicate with the local device 110. In such an example, as shown by operation 424, the local device communication application 104 does not proceed in sending data to the local device 110. Such functionality may provide additional security such that malicious code executed by the browser 106 and transmitted to the local device communication application 104 cannot control a local device 110 without the user specifically permitting the originating domain or host system 108 to access local device 110.

FIG. 7 is an example flowchart of operations that may be performed by the local device communication application 104. As shown by operation 702, the browser requests a default local device, such as a printer, from the application (e.g., the local device communication application 104). The local device communication application 104 therefore receives the request, such as by listening for requests on a local port. As shown by operation 704, the local device communication application 104 determines whether there is a default local device set. If there is a default local device stored, such as on memory 204, the local device communication application 104 determines that an associated command provided by the browser 106 the defaulted local device may be sent In some embodiments, as shown by operation 708, a user of the browser 106 may nevertheless indicate to use a different local device than the defaulted local device. In such an instance, or when a default local device is not set, the local device communication application 104 may scan the network for available local devices, as shown by operation 710. The browser 106 may therefore display the local devices to the user, so the user can make a selection, as shown by operation 712. In operation 714, the local device is selected, while the user has the opportunity to change the selected local device in operation 716. In some examples, in operation 718 the user may further indicate a command to be processed by the local device communication application 104, such as printing specified data provided by the browser, to the selected local device. As shown by operation 720, the user may continue to send data to the same selected device, or may also have the opportunity to change the selected local device in operation 716.

FIG. 8 is an example label 800 that may be printed by local device 110 in response to the local device communication application 104 transmitted a command to the local device 110. In this example, the local device 110 prints printer configuration information to a label. As another example, the local device 110 may return the data to the user device 102 (e.g., via the local device communication application 104) and the data may be displayed by the browser 106. As yet another example, the data may be transmitted from the local device 110 to the host system 180.

Embodiments provided herein advantageously provide improvements to methods for printing content from a user device 102. Example embodiments enable users to quickly install the local device communication application 104 on the fly without searching for and installing device specific drivers. Furthermore, example embodiments are compatible with a variety of browser types and operating systems, as they may be implemented with browser independent and operating system independent methods such as AJAX and/or AJAJ. On the other hand, alternative methods implemented with ActiveX®, for example, may only be compatible with Internet Explorer®. Moreover, example embodiments provide a secure solution for printing browser content from a user device, whereas other methods dependent on Java™ Applet may present inherent security vulnerabilities.

Furthermore, in some embodiments, the local device communication API 109 enables developers of the host system 108 to customize web applications such as host web application 107 to offer desired solutions to users of user device 102, without further customization of device drivers and/or the like. In an example embodiment, device specific commands such as those in a proprietary language may be generated directly on the user device 102 with the local device communication application 104, based on a standard protocol such as HTML. Embodiments therefore reduce dependencies from the host system 108 on the proprietary device control software to customize individual solutions. Developers of the host system 108 may therefore continue to enhance web applications while maintaining compatibility with the local device communication application 104 and print capabilities on local devices 110.

As described above and as will be appreciated based on this disclosure, embodiments of the present invention may be configured as computer implemented methods, user devices, web servers, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, the local device communication application 104 (e.g., circuitry 210, 212, and/or 214) to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 204) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for facilitating communication of data from a browser to a local device, wherein the browser is configured to operate on a user device, the computer-implemented method comprising:

receiving, at a computer program product executed by a processor of the user device, a device request generated by the browser, wherein the browser is to generate the device request by executing code provided to the browser by a host system, the browser to receive data defining content to be printed from the host device in conjunction with the code, wherein the device request is a communication regarding a list of available local devices;

receiving, at the computer program product, a local device selection from the browser, the local device selection indicative of a local device selected from the list of available local devices to print the content;

verify a permission status of the host system relative to the selected local device; and responsive to verifying, based on the permission status, that the host system has permission:

converting, via the computer program product, the data to a device specific command based on the local device selection, the device specific command being compatible with the selected local device; and causing, via the computer program product, transmission of the device specific command to the selected local device to cause the local device to print the content.

2. A computer program product configured to operate on a user device to enable communication between a local device and a browser, wherein the browser is configured to operate on the user device and configured to display a web page provided from a host web application, and the computer program product is configured to:

receive, at the computer program product, a device request generated by the browser, wherein the browser is to generate the device request by executing code provided to the browser by a host device in conjunction with data defining content to be displayed by the browser, wherein the device request is a communication regarding a list of available local devices;

receive, at the computer program product, a local device selection from the browser, the local device selection being selected from the list of available local devices provided to the browser by the computer program product, the local device selection indicative of the local device selected to print the content;

verify a permission status of the selected local device relative to the host web application; upon verification of the permission status:

convert, via the computer program product and based on the local device selection, the data received from the host device to a device specific command that is compatible with the selected local device; and cause transmission of the device specific command from the computer program product to the selected local device, wherein the device specific command is to cause the local device to print the content.

3. The computer program product of claim 2, wherein the computer program product is to determine the selected local device is a defaulted local device.

4. The computer program product of claim 2, wherein the computer program product is configured to:

cause the user device to output a user permission prompt relating to a host web application and the local device via the browser;

receive an authorization indication in response to the outputting of the user permission prompt via the browser; and update the permission status related to the host web application and the selected local device based on the authorization indication.

5. The computer program product of claim 2, wherein:
a local device communication application programming interface is configured for enabling embedding of the code in a host web application; and
the transmission of the device specific command to the selected local device occurs in response to execution of the code.

6. The computer program product of claim 2, wherein converting the data to the device specific command comprises converting Hypertext Markup Language (HTML) to a print command incorporating at least one of the content, style information, and positioning information derived from the HTML.

7. The computer program product of claim 2, wherein the data is received via an asynchronous JavaScript call executed by the browser.

8. The computer program product of claim 2, wherein the selected local device is a printer, and the device specific command transmitted to the printer is a print command.

9. The computer program product of claim 8, wherein the printer is controlled by Zebra Programming Language.

10. The computer program product of claim 2, wherein the device specific command causes at least one of:

the selected local device to return selected local device status information to the user device; or
the selected local device to print selected local device configuration information.

11. The computer program product of claim 2, wherein the computer program product is configured to receive a selected local device response from the selected local device.

12. The computer program product of claim 2, further comprising when the permission status is not verified between the selected local device and the requesting host web application, generate, at the computer program product, a user permission prompt to request permission to access the selected local device.

13. The computer program product of claim 2, wherein the permission status includes data configured to indicate the requesting host web application has permission to access the selected local device.

14. The computer program product of claim 2, wherein when the permission status is verified between the selected local device and the requesting host web application, record the permission status in the host server memory to avoid determining the permission in subsequent connections.

* * * * *